Figure 3:
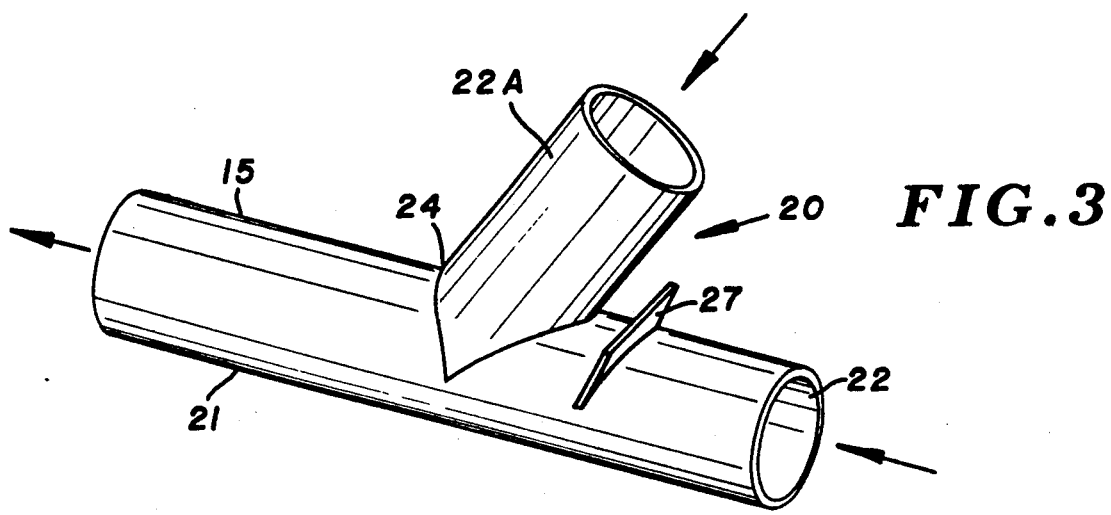

United States Patent [19]
Takata

[11] Patent Number: 5,114,078
[45] Date of Patent: May 19, 1992

[54] BAFFLE SYSTEM FOR PNEUMATIC APPLICATORS OF SOLID PARTICLES
[75] Inventor: Harry H. Takata, Edina, Minn.
[73] Assignee: Ag-Chem Equipment Co., Inc., Minnetonka, Minn.
[21] Appl. No.: 576,375
[22] Filed: Aug. 31, 1990
[51] Int. Cl.⁵ .......................... A01C 3/06; B05B 1/30
[52] U.S. Cl. .................... 239/655; 239/689; 406/86; 406/144; 406/192
[58] Field of Search ............... 239/325, 345, 346, 654, 239/655; 406/144, 153, 155, 192, 86, 92, 195; 222/630, 637; 137/896, 897; 251/326; 138/37

[56] References Cited
U.S. PATENT DOCUMENTS

| 957,126 | 5/1910 | Tilley | 406/144 |
|---|---|---|---|
| 3,719,207 | 3/1973 | Takeda | 406/92 |
| 4,147,392 | 4/1979 | Fuss | 406/39 |
| 4,529,104 | 7/1985 | Tyler | 222/630 |
| 4,569,486 | 2/1986 | Balmer | 239/655 |
| 4,767,062 | 8/1988 | Fletcher | 239/655 |
| 4,793,742 | 12/1988 | Strand | 239/655 |
| 5,020,943 | 6/1991 | Filipelli | 406/195 |

FOREIGN PATENT DOCUMENTS

| 571555 | 10/1958 | Belgium | 406/144 |
|---|---|---|---|
| 476348 | 8/1951 | Canada | 406/144 |
| 706091 | 4/1941 | Fed. Rep. of Germany | 406/144 |
| 3544767 | 6/1987 | Fed. Rep. of Germany | 406/195 |
| 215682 | 9/1967 | Sweden | 406/130 |
| 1404740 | 6/1989 | U.S.S.R. | 406/195 |
| 2213792 | 8/1989 | United Kingdom | 406/195 |

*Primary Examiner*—Andres Kashnikow
*Assistant Examiner*—Christopher G. Trainor
*Attorney, Agent, or Firm*—Haugen and Nikolai

[57] ABSTRACT

An improved baffle system for use in combination with a pressurized pneumatic system for distribution of particulate solids upon the soil. The system includes a primary or aspirating baffle disposed generally proximal in the delivery tube, along with secondary baffles disposed along the length of the delivery tubes for increasing the dispersal of the solids within the moving air stream. The baffle arrangements of the present invention enhance uniformity of distribution, particularly at high application rates.

4 Claims, 4 Drawing Sheets

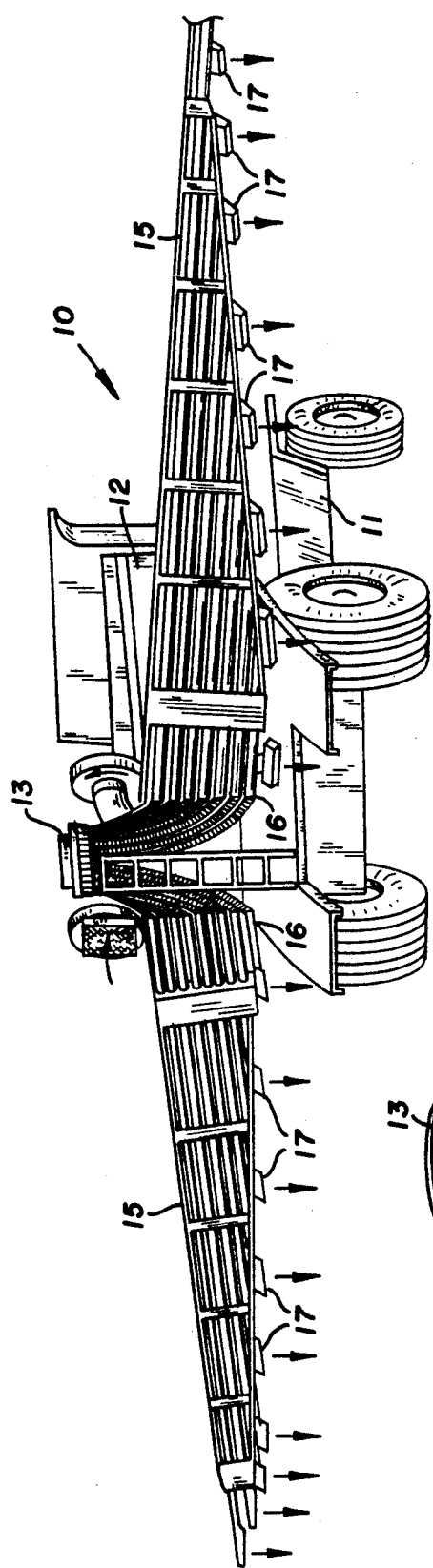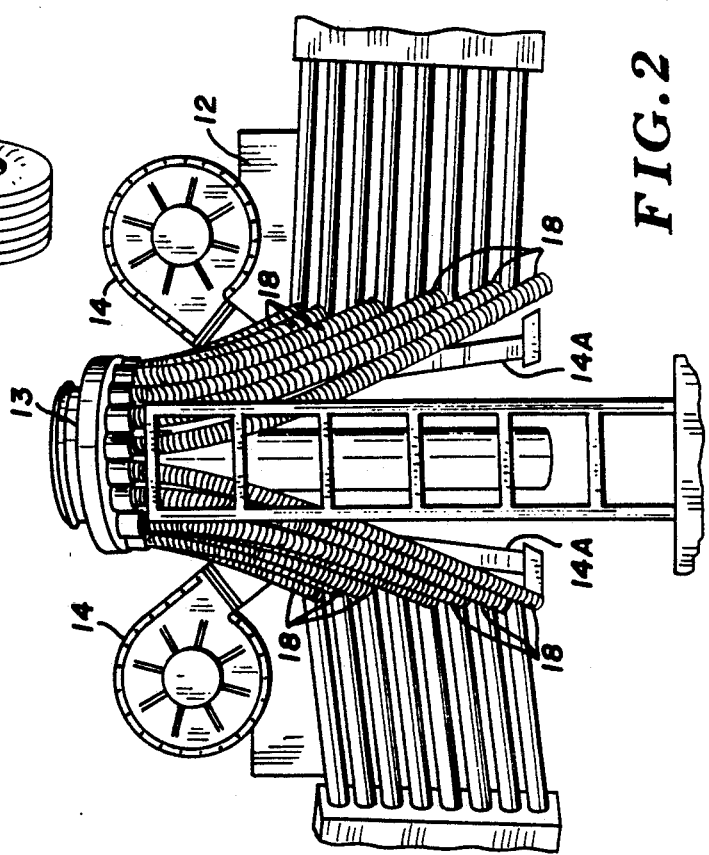

BAFFLE SYSTEM FOR PNEUMATIC APPLICATORS OF SOLID PARTICLES

BACKGROUND OF THE INVENTION present invention relates generally to an improved pneumatic spreader system for distribution of particulate material or granular solids upon the soil, and more particularly to a system for achieving uniform distribution and which is less prone to clogging. This invention is an improvement over that disclosed and claimed in my co-pending application Ser. No. 07/539,866, filed Jun. 18, 1990, entitled "VENTURI SYSTEM FOR AGRICULTURAL SPREADERS OF SOLID PARTICLES", assigned to the same assignee as the present invention.

The arrangement of the present invention achieves a more uniform flow rate of solids at high application rates and through booms of varying lengths within a given distributor. Pressurized pneumatic systems for the distribution of granular or particulate solids are known, and have been used for such purposes in the past, however the systems currently in use at high application rates may deliver or discharge solids through the distributor system at somewhat uneven rates. Particulate solids impregnated with liquid chemical solutions or dispersions have typically been troublesome.

Agricultural techniques require the utilization of soil treating agents to either encourage, discourage, destroy, or inhibit plant growth. Such agents may generally be characterized as crop treating chemicals, and include such materials as nutrients such as fertilizers, and pesticides such as insecticides and pre-emergent or post-emergent plant growth inhibitors. In other words, the term "crop treating chemical" is used in a comprehensive sense to incorporate those various ingredients utilized in agriculture to treat either the soil, plants, or insects. Active materials used for treatment are commonly found in one of three forms, either water soluble, water wettable, or in particulate solid form. In connection with the present invention, particulate solids or granular materials are of interest, with the system of the present invention being adapted for use in connection with the distribution of such materials onto the soil or other surfaces being treated, and further being particularly adapted for use in connection with the distribution of granular materials either at high application rates or when impregnated with liquid mediums, or both.

In the treatment of agricultural fields and crops through spreading of an active treating ingredient, the efficiency of the treatment operation may be enhanced if the load to be carried is reduced. Therefore, the utilization of dry particulate solids will substantially reduce the load requirement, inasmuch as water or other spreading medium or treatment vehicle is not required. The utilization of pressurized pneumatic systems will normally eliminate the need for utilization of water, and with pneumatic systems normally utilizing a compressor in lieu of a liquid pressure source for delivery of the treating ingredient. Additionally, uniform spread rates particularly at high application rates can increase efficiency as well as permitting an increase in the rate at which the treatment vehicle may be driven. Furthermore, when uniform distribution at high application rates can be achieved without necessitating an increase in air velocity, power may be conserved as well.

One common problem encountered with pressurized pneumatic systems for distribution of particulate solids or granular materials is that of uniformity of distribution. This problems becomes aggravated when high application rates are being employed, or when the granular materials are impregnated with other active components in a liquid medium. One factor leading up to lack of uniformity of distribution is a tendency for the granular materials to become lodged in the distribution system, thereby clogging or partially clogging a portion of the system. Such an event will, of course, impede normal air flow through the system. The pressurized pneumatic systems normally employ a plurality of elongated hollow delivery booms, with these booms being of predetermined and differing lengths, and extending laterally outwardly of the supporting vehicle. By extending the length of individual elongated delivery booms on either side of the vehicle, the area of coverage may be correspondingly increased. However, as boom length or application rates increase, problems with clogging, material build-up, and the resulting lack of uniformity of distribution have been found to increase proportionately. The features of the present invention have been found to reduce the tendency to clog even at high application rates, and thus enhance the uniformity of distribution of particulate solids from the system and onto the soil The system further has been found to decrease material build up in certain portions of the system, particularly at the point where particulate solids are being introduced into the delivery booms. Conventional systems have been found to experience pulsating outputs, partial clogging of the boom tubes, and/or material build up, particularly when unusually high application rates are being employed and/or when particulates are of coarse high density materials. The features of the present invention have been found desirable for improving the performance of systems using elongated hollow discharge or delivery booms.

Spreading efficiency and economies of application are improved through use of a system of the present invention. Vehicles may be driven at significantly higher rates of speed, inasmuch as uniformity of spreading rates are preserved. Spreading rates are, of course, inversely proportional to vehicle speed, and application accuracy is preserved whenever uniform discharges are achieved.

SUMMARY OF THE INVENTION

Briefly, and in accordance with the present invention, an improved granular chemical application system is provided which improves the performance of pressurized pneumatic applicator systems by providing for substantially uniform distribution of particulate solids upon the surface of the soil, particularly at high application rates. The improved system is preferably mounted upon a vehicle such as a self-propelled vehicle including either a tractor or trailer chassis, with the system including a reservoir with a source of supply of agricultural crop treating chemicals in granular or particulate solid form to be distributed, such as, for example, a nutrient such as a fertilizer and/or a pesticide such as an insecticide or herbicide, along with a spreader or distribution mechanism. The system is provided with a number of conventional components, including the following:

(a) a reservoir or hopper for retaining a supply of particulate solids;

(b) a means of conveying a metered supply of particulate solids to a distribution head where the supply is being divided into a number of aliquot portions;

(c) a means for delivering the metered aliquot portions to the booms; and (d) a means, such as a blower delivering a supply of compressed air, for moving the material outwardly of the booms to a point of discharge.

Turning to these components briefly, and individually, a distribution head is provided, as indicated, for receiving a metered supply of particulate solids, and for apportioning these solids into a plurality of generally aliquot portions. Such distribution heads are well known in the art, and the present system is well adapted for use with any of a variety of such heads. A plurality of elongated hollow discharge or delivery booms or tubes are employed in the system, with the proximal end of each tube being coupled to and receiving a source of pressurized or compressed air such as at a plenum chamber, which receives its supply or charge of air from a blower. A tubular conduit or feed supply tube is coupled to the output of the distribution head, and is adapted to convey one aliquot portion to a junction point located adjacent the inner or proximal end of a discharge or delivery boom or tube at a point closely spaced and immediately downstream from the proximal end of the boom. The flow of air through the booms therefore provides a dual purpose, one purpose being to carry granular material to the discharge point of the boom, the other being to create a partial vacuum in the tubular conduit or feed supply tube for injection of granular solids into the air stream. Therefore, each conduit or tubular feed member delivers one aliquot portion from the distribution head into the boom, with the compressed air carrying or moving the particulate solids outwardly to the delivery point located at the boom tip. In order to improve the uniform introduction and transfer of particulate solids or granular material into the boom at high output rates, an improved inlet baffle means is provided to the system at the point of particulate solid or granular product injection. The improved baffle is mounted within each of the booms at a point immediately upstream from and adjacent the junction of each elongated boom with the tubular feed member. In another aspect of the invention, a secondary baffle means is provided along and at spaced intervals within the elongated delivery tubes. The secondary baffle means has been found to disperse the granular material within the air flow so as to increase uniformity of spreading rate without requiring additional power to deliver greater quantities of air into and through the elongated delivery tubes.

The inlet baffle means comprises a contoured plate or blade means disposed immediately upstream of the point at which the tubular feed member intersects the elongated boom. The blade means further extends radially inwardly of the boom and at an angle which converges toward the distal end of the boom. The opening which is defined between the convex inner tip of the blade and the surface of the delivery tube is concavo-convex, being generally arcuate along both of its surfaces. This configuration for the open area or zone provides a means for equalizing the flow of air across the entire opening within the boom, with this feature having been found to considerably reduce any tendency of the granular material to build up in the area of injection and thus contribute to clogging. The axial position of the blade means along the boom is such that the inner tip of the blade is closely adjacent a projection of the tubular feed member from its intersection with the hollow delivery tube or boom. In a typical boom arrangement, the inlet baffle means may be axially spaced inwardly of the intersection point by a distance of approximately one-half inch when a two and one-half inch delivery tube is employed.

Pressurized pneumatic spreader systems known in the past have employed aspiration means to assist in bringing the granular or particulate solids into the discharge flow, and to otherwise assist in introduction of solids into the booms. Specifically, the aspiration means utilized in the past have frequently been in the form of a Venturi created by introducing the end segment of tubular feed member a certain distance downwardly into the interior of the boom, thereby forming a partial constriction. The configuration of the open area when created in this fashion was generally a modified crescent shape, with the tube wall providing a configuration with straight inner ends. Such a configuration has been found to contribute significantly to clogging, particularly at and adjacent the tips of the opening. In the present arrangement, the constriction is created by a single radiused blade, and with neither intersecting tubing entering the other so as to provide a generally fully open tube. This arrangement is designed to maintain an even and continuous flow of air and solids into the system. This arrangement has been found to avoid clogging of the feed supply conduit or tube and boom with quantities of granular material or particulate solids during high application or solids flow rates. The blade design is such that it is normally set in place and with its position designed to provide for a continuous and uniform distribution or flow of particulate solids through the boom. In connection with the system of the present invention, it has been found that the blade combination and the configuration of the constriction which it provides, aids in effecting even and positive flow for the solids entering the boom particularly at high solids flow rates. In other words, the blade provides a throat configuration which achieves constant, continuous, predictable and uniform flow at high application rates to assist in control and movement of particulate solids into and through the elongated boom structures.

In connection with the other aspect of the present invention, secondary baffles are provided at spaced intervals along the length of each of the elongated delivery tubes or booms. These secondary baffles have a low profile, but nevertheless are capable of introducing turbulence into the air flow, and thus enhance the dispersion of the solids into the moving air stream. It has been found that at high application rates, a relatively larger proportion of the solids settle or otherwise flow or move along the lower portion of the delivery tube. The secondary baffles create zones of turbulence along the length of the tube, and thus increase the cross-sectional uniformity of the distribution of solids into the flowing air stream.

Therefore, it is a primary object of the present invention to provide an improved system for delivery of granular material or particulate solids from a pressurized pneumatic system, wherein an improved aspiration means is mounted in place in order to more uniformly and more continuously introduce and disperse particulate solids into the flow of pressurized air moving through each of the delivery booms particularly at high solids application rates.

Figure 4:
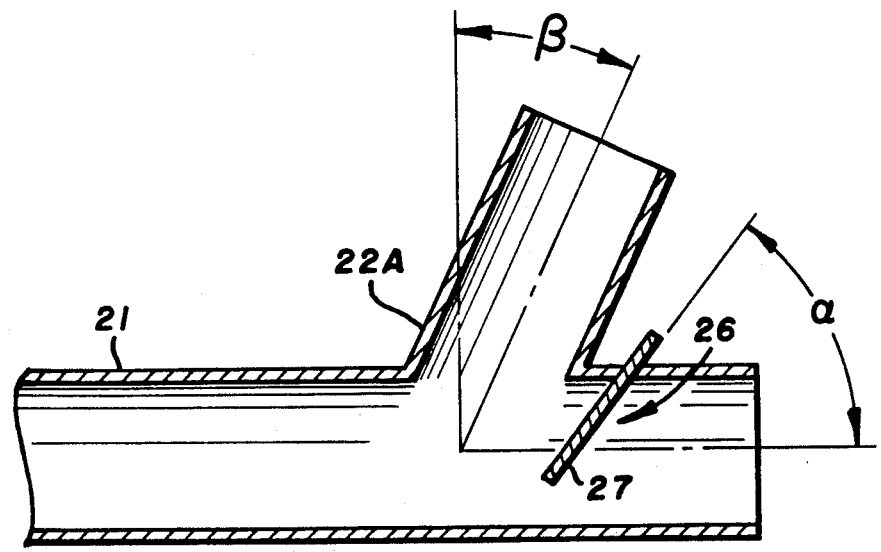
Figure 5:
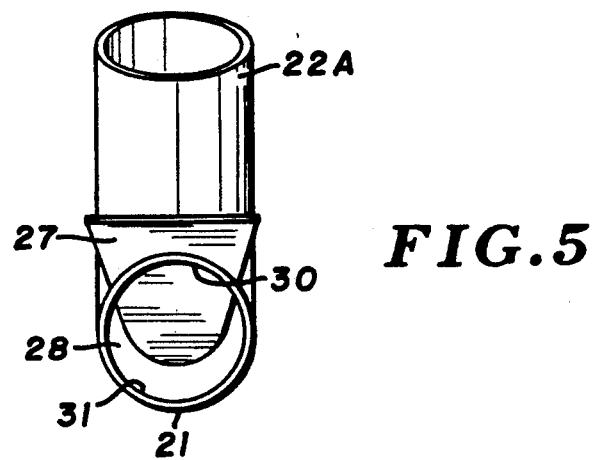
Figure 6:
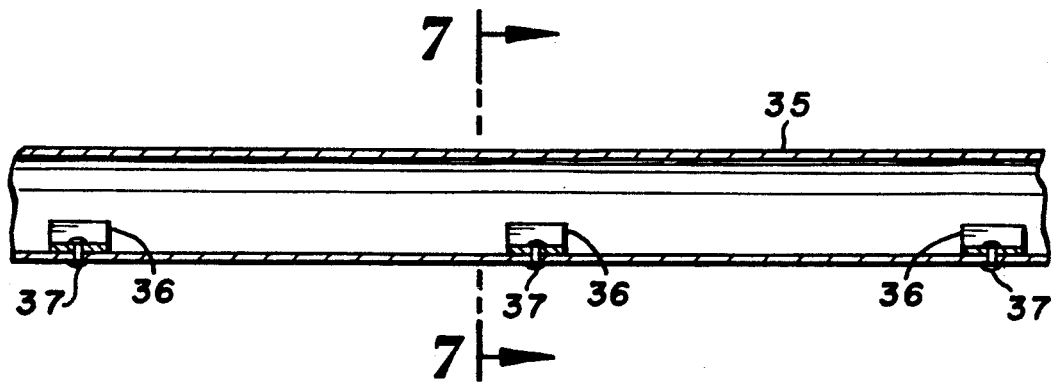
Figure 7:
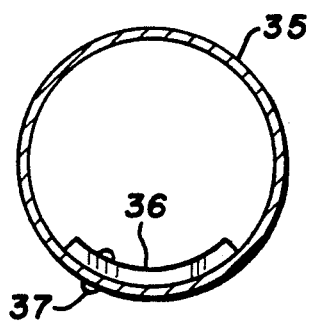
Figure 8:
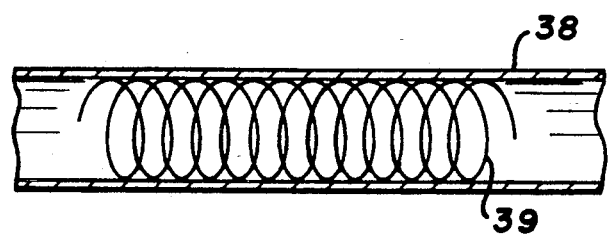
Figure 9:
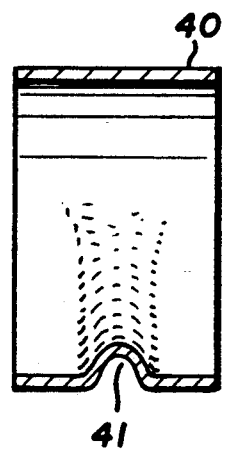
Figure 10:
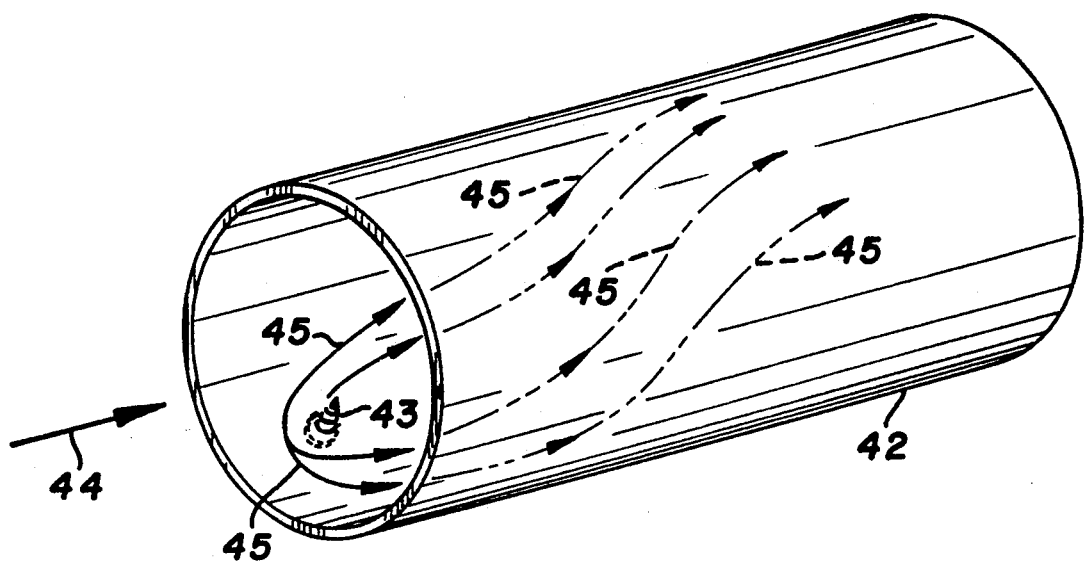

It is yet a further object of the present invention to provide an improved aspiration system for use in combination with pressurized pneumatic systems for distribution of particulate solids, and wherein the system includes a blade means designed to control the flow of air and introduction of large quantities of particulate solids into the stream or flow of air moving through the system.

It is yet a further object of the present invention to provide an improved pressurized pneumatic system for the distribution of particulate solids upon an agricultural field, and wherein the system is provided with an improved means for maintaining a uniform distribution of solids through the tube at high flow rates, and wherein primary and secondary baffle means are provided to avoid non-uniform delivery of the particulate solids in and along the hollow delivery boom while operating at high flow rates.

Other and further objects of the present invention will become apparent to those skilled in the art upon a study of the following specification, appended claims, and accompanying drawings.

IN THE DRAWINGS

FIG. 1 is a perspective view of the side and rear portions of a typical vehicle chassis supporting a vehicular-mounted system incorporating a distribution head, a pair of compressors, and a plurality of elongated hollow delivery booms, and wherein the booms are provided with the improved flow-control means of the present invention;

FIG. 2 is a fragmentary perspective view of the central or manifolding portion of the system illustrated in FIG. 1;

FIG. 3 is a detail perspective view of the external portions of the hollow delivery booms of the present invention, and illustrating the point at which the solid supply tube joins the delivery boom, and also the point at which the improved baffle means of the present invention is positioned;

FIG. 4 is a view taken through the diameter of that portion of the device illustrated in FIG. 3;

FIG. 5 is an end view of that portion of the device illustrated in FIG. 4;

FIG. 6 is a sectional view taken through the diameter of a portion of a delivery tube, and illustrating one form of secondary baffle in place therein;

FIG. 7 is a vertical sectional view taken along the line and in the direction of the arrows 7—7 of FIG. 6;

FIG. 8 is a view similar to FIG. 6, but illustrating a somewhat modified form of secondary baffle lodged within the length of a segment of a delivery tube;

FIG. 9 is an additional view similar to that of FIG. 6, but illustrating a modified form of spaced baffle formed within the delivery tube; and FIG. 10 is a partial perspective view showing a segment of a delivery tube into which a modified form of secondary baffle for inducing turbulence in the flow has been placed.

DESCRIPTION OF THE PREFERRED EMBODIMENT

In accordance with the preferred modification of the present invention, and with particular attention being directed to FIGS. 1 and 2 of the drawings, the pressurized pneumatic distribution system generally designated 10 is mounted upon vehicle chassis 11, and includes a reservoir 12 for retaining a source of supply of particulate solids to be distributed through the system. A distribution head 13 is provided for apportioning or dividing the particulate solids received or delivered from reservoir 12 into a plurality of generally aliquot portions. A plurality of elongated hollow delivery tubes forming booms 15—15 are provided to receive and deliver or spread the solids, with the booms being of predetermined and differing lengths, and extending laterally outwardly of the vehicle from proximal ends 16—16 to distal discharge ends 17—17. A source of compressed air such as blower 14 for the pressurized pneumatic system is utilized to create a flow of pressurized air into each plenum or manifold 14A and from the plenum into the proximal ends 16—16 of each boom, and ultimately through each of the hollow elongated booms 15 to outlet or discharge. Such blowers or other sources of compressed air, and their arrangement in this type of system is, of course, well known to those in the art, and need not be described in detail here. As is apparent in FIG. 1, a cooler device may be employed in combination with one of the blowers in order to cool hydraulic fluid being used within the system. Such a device is illustrated in FIG. 1, with this cooler being removed in the view of FIG. 2. A plurality of tubular feed members 18—18 are also provided, with each of such tubular feed members extending between and coupling a selected output of the distribution head 13 to a selected one of said delivery booms 15—15. Also, as is conventional, the tubular feed members 18—18 provide for delivery of each of the aliquot portions into the elongated boom 15 at a point adjacent the proximal end 16, and for ultimate delivery to the distal discharge ends 17 of each tube in the boom. Also, as indicated, such spreader structures are known in the art and need not be discussed and described in detail here. One such spreader structure is illustrated in U.S. Pat. No. 3,568,937 to Grataloup, with another such system being disclosed in U.S. Pat. No. 2,206,876 to Chater.

As will become apparent hereinafter, each of the tubular feed members 18—18 is coupled to a selected one of the hollow delivery booms 15—15 at a juncture point adjacent the proximal end of one of the booms, and thus achieves its purpose of continuously and uniformly introducing on aliquot portion of the particulate solids to the flow of pressurized air moving through each of the delivery booms. This introduction of particulate solids into the delivery booms is undertaken on a basis such that the actual introduction of the solids into the flow of pressurized air is enhanced, thereby reducing if not totally eliminating tendencies of the solid particles to build up in selected locations, and thereby tend to clog the output of the boom particularly at high application rates.

Attention is now directed to FIGS. 2-4 of the drawings wherein details of the aspiration arrangement provided within each of the hollow delivery tubes or booms is disclosed. Specifically, and with attention being directed to FIGS. 2-4 of the drawings, the flow controlling-aspiration generating blade containing portion generally designated 20 (the aspiration zone) of the system 10, comprises an axial segment 21 of one of the delivery booms 15—15, with the end 22 being an end adjacent the proximal end of tube 21. A segment of a tubular feed member 22A is also shown, with this segment having been previously referred to as one of the plurality of tubular feed members 18—18. Tube segment 22A is coupled with boom segment 21 at juncture point 24.

Aspiration means are provided within the system as shown generally at 26. Aspiration means 26 includes a blade 27 having a generally or modified parabolic configuration intersecting with the inner cross-section of boom segment 21. Reference is made to FIG. 5 for the general configuration of inner tip of blade 27. Blade 27 is mounted just proximal to the junction between tubular feed member 22A and boom segment 21, particularly as illustrated in FIG. 4. The zone between the radially inwardly disposed tip of blade 27 and the inner periphery of boom segment 21 defines a gap shown at 28, and thus controlling the cross-sectional area available for the flow of air through the aspiration zone 20. The tip of the blade 27 extends generally along a modified parabolic arc or line within delivery boom segment 21, with the tip of the blade 27 being shown in profile in FIG. 5.

The blade 27 is mounted at an angle which converges toward the distal end of the boom. The angular disposition between blade 27 and the axis of boom segment 21 is shown as the angle $\alpha$, with this angle being preferably between about 50° and 60°, and most preferably at 60°. Furthermore, the inner tip of blade 27 intersects a substantial portion of the inner periphery of boom segment 21, with this intersection zone being shown at 30 (FIG. 5). Typically, the intersection area will be in the range of approximately 120°, with the balance of the inner circumference of tube segment 21 being open such as shown at 31. This configuration and disposition of blade 27 assists in controlling the flow of air through the system and in creating the vacuum in tube 22A. The arrangement and configuration of the inwardly extending tip of blade 27 has been found to be useful in maintaining uniform flow of solids through the system, and also in avoiding any tendency toward clogging of the system, particularly at high application rates.

With continued reference to FIGS. 3 and 4 of the drawings, it will be noted that tubular feed member 22A intersects boom segment 21 at an acute angle. For most purposes, and for accommodating high application and flow rates, this angle, designated as $\beta$ in FIG. 4 is preferably arranged at 25° from the vertical or, alternatively, 65° from the axis of segment 21.

As indicated in the drawings, blade 27 is normally set in place, but can be made to be adjustably positioned in order to create the appropriate vacuum in the tube 22A for operation at a variety of application rates, including particularly high application rates. As indicated, blade 27 aids in effecting uniform and positive flow of the solids, and the configuration of the opening eliminates or substantially reduces any build up or clogging of particulate solids within the delivery tubes, particularly within that segment of the tube shown at 21, and while operating a high application rates.

DESCRIPTION OF THE SECONDARY BAFFLE SYSTEM

Attention is now directed to FIGS. 6–10 of the drawings which illustrate the interposition of secondary baffles within the elongated delivery tubes or booms. Specifically, axially spaced-apart baffles are provided in order to introduce modest turbulence within the air stream, so as to more uniformly disperse the solids through he cross-sectional flow. In FIGS. 6 and 7, one form of secondary baffle is illustrated, with other secondary baffle configurations being shown in FIGS. 8–10.

With attention now being directed to FIGS. 6 and 7 of the drawings, delivery tube 35 is provided with a ring segment or baffle member 36, with ring member 36 being firmly attached within and adjacent the inner periphery of tube 35 with rivet 37. Ring 36 typically occupies no more than 90° of arc. For a two and one-half inch delivery tube, baffle member 36 may conveniently be fabricated from 0.025 inch stainless steel, with the useful cross-sectional thickness being up to 16-gauge steel having a thickness of about one-sixteenth inch. The length of baffle 36, in the embodiment illustrated in FIGS. 6 and 7 will typically be approximately three-quarter inch, although somewhat longer or shorter lengths may be useful. This arrangement provides sufficient turbulence for air flow so as to increase and render more uniform the dispersion of solids into the flowing air stream. In this arrangement, therefore, the baffle thickness constitutes less than about five percent of the tubing radius. The typical axial spacing between the baffle members of FIGS. 6 and 7 will preferably be between 2.5 feet and 10 feet.

While attention now being directed to FIG. 8 of the drawings, it will be observed that tube segment 38 is provided with a helically wound member 39 within and snug against the inner periphery of tube 38. Helical member 39 may conveniently be a spring member or the like having a wire diameter of, for example, approximately one-sixteenth inch. The axial spacing between individual winds will preferably be in the range of, for example, 4 inches–10 inches.

With attention now being directed to FIG. 9, it will be noted that tube segment 40 is provided with an indentation as at 41 which forms and provides the secondary baffle. Again, for most purposes, an indentation in the range of approximately one-sixteen inch will be sufficient to create the necessary dispersal effect, with an arcuate range of approximately 90° being deemed appropriate. Additional arcuate ranges, if employed, are not believed to contribute significantly to turbulence in the air stream, but would be expected to contribute to increased back pressure.

With attention now being directed to FIG. 10 of the drawings, it will be observed that the delivery tube segment 42 is provided with a means for inducing turbulence within the flow, such as at 43. Member 43 is a sheet metal screw which has been mounted through the wall of tube 42, with the threaded end extending inwardly a distance of approximately one-half inch. The head of sheet metal screw 43 is, of course, disposed outwardly of the tube, and is illustrated in phantom in FIG. 3. With the air flow moving along tube 42 in the direction of arrow 44, turbulence is induced about the exterior of the wall of screw 43 such as is illustrated in the flow direction arrows 45—45. It will be noted that sheet metal or self-tapping screw 43 is mounted within tube segment 42 at an arcuate angle of approximately 205° from the bottom dead center of tube 42. This mounting angle aids in inducing turbulence in the flow, and also provides a convenient mounting angle for tube wall access. In certain other instances, other arcuate dispositions may be employed, it being noted that the preferred disposition is along the bottom portion of the tube where the added turbulence has been found beneficial to flow and dispersion.

The system of the present invention is particularly adapted for use with systems having multiple hollow delivery booms of differing lengths. In certain instances, it has been found desirable to increase the tube diameter of the longer tubes or booms utilized in multiple boom systems in order to reduce back pressure in these boom members. Also, the outward portions of the longer booms may be coupled with an expanded zone so as to have at least a portion of the delivery boom provided with a somewhat increased diameter relative to the shorter booms. Such a design provides a means of reducing back pressure on longer booms, along with maximum vacuum in tube 22A coupled to the distributor head. Such an arrangement, taken together with the utilization of a blade of the type shown at 27, with blade 27 having been found to provide distribution patterns which are generally more equal, one to another, particularly when being utilized under conditions of high application rates.

TYPICAL OPERATING PARAMETERS

In order to provide for appropriate performance of the primary baffle, it will be noted as illustrated in FIG. 5, that baffle 27 occupies more than 180° of the tube wall, and as previously indicated, approximately 120° is closed, while the remaining 240° is open.

By way of further explanation, in using a two and one-half inch delivery tube, the gap between the distal tip of blade 27 and inner periphery of tube 21 is typically in the range of approximately five-eighth inch. The radius of arc of baffle plate 27, at the distal end, is typically seven-eighth inch. In this arrangement, with the air being driven through tube 21 at 95 miles per hour, the manifold pressure measured in the manifold manometer is 28 inches of water, while that in the drop tube manometer is 13 ½ inches of water. As indicated, with tube segment 22A being open at atmosphere, air flow of 95 mph along tube segment 21 will drop to 77 mph when tube 22A is closed. These operating parameters are provided for an indication of performance of primary baffle 27 in the system. When secondary baffles are interposed, the vacuum measured at and along tubing 22A drops only modestly, as does the flow rate through the tubing. Thus, the presence of secondary baffles in the system does not adversely affect system performance nor does it add to the power requirements of the delivery system.

It will be further appreciated that the details of the design illustrated here are for purposes of illustration only, and are not to be construed as a limitation upon the scope of the present invention.

What is claimed is:

1. In combination with a pressurized pneumatic system for substantially uniform distribution of particulate solids upon the soil from a distribution system mounted upon a self-propelled vehicle and including a reservoir with a source of supply of particulate solids to be distributed, a distribution head means for metering and apportioning said supply of particulate solids into a plurality of generally aliquot portions, a plurality of elongated hollow delivery tubes of predetermined and differing lengths, with of said each delivery tubes extending laterally outwardly of said vehicle from a proximal end to a distal discharge end, a source of compressed air for creating a flow of pressurized air through said hollow elongated delivery tubes, a plurality of tubular feed members, each of said feed members extending between said distribution head means and a selected one of said delivery tubes, for delivery of each of said aliquot portions into the proximal end of one of said delivery tubes for movement to and discharge from the distal discharge end of said tube, each one of said tubular feed members intersecting the delivery tube to which it is coupled at a juncture point adjacent the proximal end of the delivery tubes for introducing one of said aliquot portions to the flow of pressurized air moving through each of said delivery tubes; the improvement comprising:
   (a) aspiration means mounted within each of said hollow delivery tubes between said juncture point and said proximal end immediately upstream from said juncture point, said aspiration means comprising a blade means having an arcuate distal end defining an arcuate opening with symmetrical tapering tips across the cross-sectional area of said hollow delivery tube;
   (b) said blade means, including the distal end thereof, extending radially inwardly of said hollow delivery tube at a tube intersecting angle which converges toward the distal end of said tube, and wherein said intersecting angle is from between about 50° and 65° from the axis of said delivery tube.

2. The system as defined in claim 1 being particularly characterized in that the angular intersection between said delivery tube and said tubular feed member is between about 20° and 30°.

3. The system as defined in claim 1 being particularly characterized in that said intersecting angle is approximately 60°.

4. The system as defined in claim 2 being particularly characterized in that the angular intersection between said delivery tube and said tubular feed member is approximately 25°.

* * * * *